L. T. HAMMOND.
WRENCH.
APPLICATION FILED FEB. 14, 1916.
1,201,723.
Patented Oct. 17, 1916.
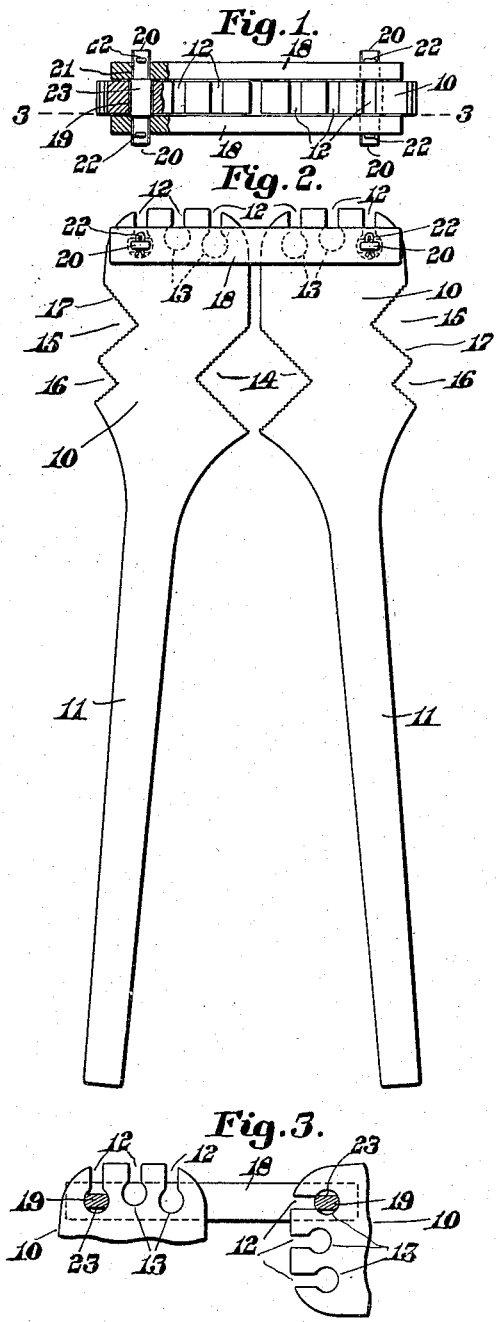
Inventor:
Lorenzo T. Hammond,
by Walter E. Lombard,
Atty.

UNITED STATES PATENT OFFICE.

LORENZO T. HAMMOND, OF COTUIT, MASSACHUSETTS.

WRENCH.

1,201,723.   Specification of Letters Patent.   Patented Oct. 17, 1916.

Application filed February 14, 1916. Serial No. 78,737.

*To all whom it may concern:*

Be it known that I, LORENZO T. HAMMOND, a citizen of the United States of America, and a resident of Cotuit, in the county of Barnstable and Commonwealth of Massachusetts, have invented certain new and useful Improvements in Wrenches, of which the following is a specification.

This invention relates to hand operated gripping devices and particularly to devices of this character that are intended to be used in connection with pipes and pipe fittings.

It has for its object the provision of a simple device with a minimum number of parts which is adapted for use on various diameters of pipes, nipples, unions, and the like.

The invention consists of two coacting gripping members provided with registering notches in their edges and connected together by a link having pivot members adapted to be interchangeably positioned in a plurality of openings in said gripping members.

The invention further consists in certain novel features of construction and arrangement of parts which will be fully understood by reference to the description of the drawings and to the claims hereinafter given.

Of the drawings: Figure 1 represents a plan of a device embodying the principles of the present invention. Fig. 2 represents an elevation of the same, and Fig. 3 represents a section of the upper part of the same on line 3—3 on Fig. 1, and showing one of the gripping members in position to be removed from its pivot member.

Similar characters designate like parts throughout the several figures of the drawings.

In the drawings, 10, 10 are two gripping members having at one end the long handles 11, 11 while the opposite ends are each provided with a plurality of slots 12, 12 terminating in cylindrical openings 13 having diameters somewhat greater than the width of said slots 12. Each gripping member 10 is provided in one edge with a notch 14 and in its opposite edge with two smaller notches 15 and 16, the notch 16 being smaller than the notch 15, all as shown in the drawings. The working surfaces of the notches 14, 15, and 16 are preferably serrated as indicated at 17. The slotted ends of the gripping members 10 are connected by the links 18 having pivot members 19 interposed between them. These members 19 have at each end reduced flattened portions 20 extending through slots 21 in the links 18, the shoulders formed by said reduced ends bearing against the inner faces of the links 18 and keeping them separated a distance slightly in excess of the width of the gripping members 10. The reduced ends or portions 20 extend beyond the outer faces of the links 18 and are locked in position by the cotter pins 22. It is obvious that the flattened sides of the portions 20 fitting the slots 21 in the links 18 will retain these members in position with the parallel sides 23 of the body portion thereof parallel with the length of said links 18 as shown clearly in Fig. 3. When it is desired to assemble the connector 18—19 and the gripping members 10 the latter are moved into position relatively to the connector 18—19 shown at the right of Fig. 3, and the pivot member 19 is inserted in the selected slot 12 and opening 13, and then the gripping member 10 is moved about said pivot 19 into the position shown at the left of said figure in which position it will be impossible for the gripping members to be accidentally disconnected from said pivot. In fact it will be impossible to disconnect the gripping members 10 in their movements about said pivots 19 until such disconnection is desired and the members 10 are again brought into the position indicated at the right of Fig. 3. These gripping members are shown in the drawing with the notches 14, 14 in register, but they may be moved 180° about the pivots 19 so that their notches 15, 15 and 16, 16 will be in register. The positions of the gripping members relatively to each other may be varied by changing the pivot members 19 into the inner openings 13 or into the intermediate openings 13, and further variation may be obtained by locating one pivot member 19 in an outer opening 13 and the other pivot member 19 in an inner opening 13. It is self-evident, therefore, that the members 10 may be varied at will to accommodate the various notches 14, 15, and 16 to pipe fittings of many different diameters. The device is particularly adapted for use on close nipples where ordinary pipe wrenches cannot be used, the members 10 being of such a width that they may readily enter between the ends of the larger pipe fittings connected by such nipples. The device may be used to turn the nipple in another fitting or it may be held from turning while another fitting is removed therefrom by means of another wrench. When not in use the members 10 may be removed from the connector 18—19 and will occupy but little space in the workman's grip or tool chest.

The operation and many advantages of the invention it is believed will be fully understood from the foregoing description.

Having thus described my invention, I claim:

1. In a device of the class described, the combination of two plates; two pivot members interposed between said plates at opposite ends thereof; and coacting gripping members adapted to be reversed and each having one end provided with a plurality of openings therethrough either of which is adapted to engage a pivot member.

2. In a device of the class described, the combination of two plates; two pivot members interposed between said plates having flat sides parallel with the length of said plates; and coacting gripping members each having an end provided with a cylindrical opening adapted to engage a pivot member and a slot extending from said opening to the extreme end of said gripping member, said slot having a width substantially the thickness of said pivot member.

3. In a device of the class described, the combination of two plates; two pivot members interposed between said plates having flat sides parallel with the length of said plates; and coacting gripping members each having an end provided with a plurality of cylindrical openings adapted to engage a pivot member and a slot extending from each of said openings to the extreme end of said gripping member, said slots having a width substantially the thickness of said pivot member.

4. In a device of the class described, the combination of two coacting gripping members, each having, in opposite edges, notches of different sizes adapted to coöperate in pairs; and means for connecting corresponding ends of said members together having provision for pivotal movement of both gripping members and the adjustment of their pivots toward and from each other.

Signed by me at 4 Post Office Sq., Boston, Mass., this 12th day of January, 1916.

LORENZO T. HAMMOND.

Witnesses:
WALTER E. LOMBARD,
NATHAN C. LOMBARD.

Copies of this patent may be obtained for five cents each, by addressing the "Commissioner of Patents, Washington, D. C."